(12) United States Patent
Vasey

(10) Patent No.: US 7,472,343 B2
(45) Date of Patent: Dec. 30, 2008

(54) SYSTEMS, METHODS AND COMPUTER PROGRAMS FOR ANALYSIS, CLARIFICATION, REPORTING ON AND GENERATION OF MASTER DOCUMENTS FOR USE IN AUTOMATED DOCUMENT GENERATION

(75) Inventor: Philip Edgar Vasey, Histon (GB)

(73) Assignee: Business Integrity Limited (GB)

( * ) Notice: Subject to any disclaimer, the term of this patent is extended or adjusted under 35 U.S.C. 154(b) by 477 days.

(21) Appl. No.: 10/434,753

(22) Filed: May 9, 2003

(65) Prior Publication Data

US 2004/0060005 A1    Mar. 25, 2004

Related U.S. Application Data

(60) Provisional application No. 60/379,884, filed on May 10, 2002.

(51) Int. Cl.
  *G06F 17/00*    (2006.01)
  *G06F 12/00*    (2006.01)

(52) U.S. Cl. .................. 715/234; 715/209; 715/235; 715/255; 707/100

(58) Field of Classification Search ............ 715/513, 715/517, 522, 530, 200, 205, 209, 210, 229, 715/234, 235, 248, 249, 255, 256, 700, 760, 715/762; 707/1, 100, 200
See application file for complete search history.

(56) References Cited

U.S. PATENT DOCUMENTS 5,267,155 A * 11/1993 Buchanan et al. .......... 715/540
5,272,623 A    12/1993 Grubb et al.
5,313,394 A    5/1994  Clapp
5,446,653 A    8/1995  Miller et al.
5,640,577 A    6/1997  Scharmer
5,692,206 A * 11/1997 Shirley et al. ............. 715/531
5,704,029 A    12/1997 Wright, Jr.
5,893,914 A    4/1999  Clapp
6,108,661 A *  8/2000  Caron et al. ............. 707/102

(Continued)

FOREIGN PATENT DOCUMENTS

EP    0481 995 B1    5/1997

(Continued)

*Primary Examiner*—Doug Hutton
*Assistant Examiner*—Maikhanh Nguyen
(74) *Attorney, Agent, or Firm*—Anderson Gorecki & Manaras LLP

(57) ABSTRACT

A system and method of generating data representing a master document for use in an automated document generation system comprises storing data representing a first mark-up notation or style and data representing a second mark-up notation or style different to the first mark-up notation or style. Data representing a mapping between the first and second mark-up notations or styles is stored. Data representing a precedent or master document written in the first mark-up notation or style is received. The received data is analyzed, in dependence on the data representing the first mark-up notation or style, to determine component elements of the first precedent or master document and the interrelationships of the component elements. Data is generated representing a precedent or master document written in the second mark-up notation or style based on the analysis and dependent on the data representing the mapping and the second mark-up notation or style. Lastly, the generated data is output.

26 Claims, 12 Drawing Sheets

U.S. PATENT DOCUMENTS

| | | | |
|---|---|---|---|
| 6,182,095 B1 * | 1/2001 | Leymaster et al. | 715/515 |
| 6,490,547 B1 * | 12/2002 | Atkin et al. | 704/8 |
| 6,826,555 B2 * | 11/2004 | Nunez | 707/2 |
| 6,938,203 B1 * | 8/2005 | Dimarco et al. | 715/513 |
| 7,000,183 B1 * | 2/2006 | Crawford, Jr. | 715/530 |
| 2001/0051962 A1 * | 12/2001 | Plotkin | 707/522 |
| 2002/0169851 A1 * | 11/2002 | Weathersby et al. | 709/218 |
| 2003/0140053 A1 * | 7/2003 | Vasey | 707/100 |
| 2003/0172355 A1 * | 9/2003 | Ponce et al. | 715/517 |

FOREIGN PATENT DOCUMENTS

| | | |
|---|---|---|
| EP | 0 475 964 B1 | 6/1997 |
| EP | 0 843 266 A2 | 5/1998 |
| WO | WO 90/15392 | 12/1990 |
| WO | WO 91/06056 | 5/1991 |
| WO | WO 95/07510 | 3/1995 |
| WO | WO 01/04772 A2 | 1/2001 |

* cited by examiner

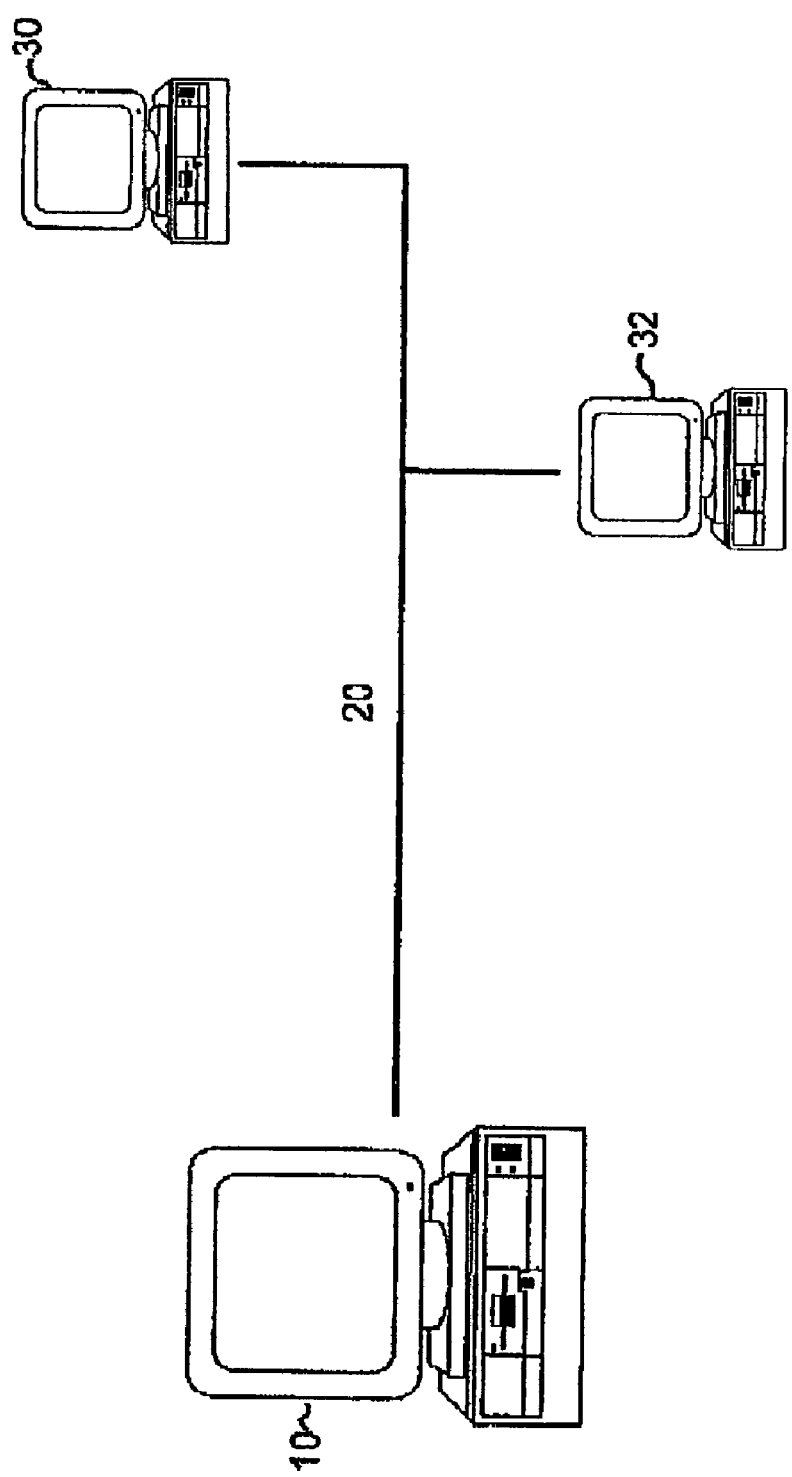

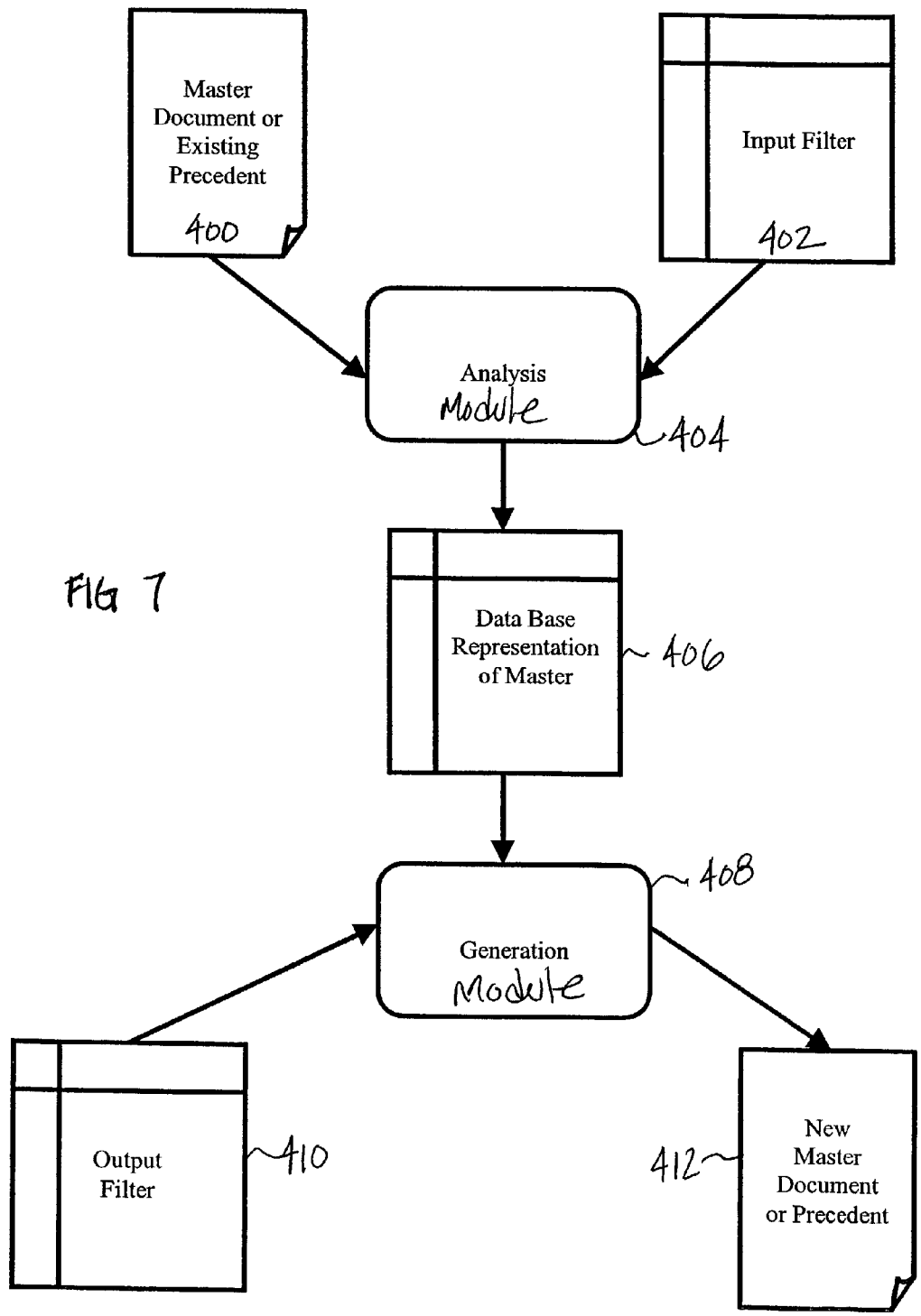

| Object Type | Occurence Number | Character Position | Text | Other Info |
|---|---|---|---|---|
| variable | 1 | 345-355 | *Date:Agreement* | used in usage rule 4<br><br>same as variable 3 |
| conditional | 2 | 23-44 | *"This agreement is made the {Date:Agreement}".* | depends on usage rule 1<br><br>level 2 nesting |
| usage rule | 4 | 45-65 | *((Jurisdiction = "England and Wales") AND ((Date:Agreement <= 1.1.2002) XOR (Purchase:Price NOT >=MIN( Risk Threshhold, Term:Agreement * Purchaser:Credit))))* | used in conditional 4 |
| paragraph | 1 | 0-84 | *"This agreement is made the {Date:Agreement}"* | refers to guidance 7 |
| cross - reference | 23 | 4553-4554 | *Exit Clause* | |
| include object | 3 | 234-244 | *Exit Clause* | |
| calculation | 4 | 345-365 | *Purchase:Price + Stamp:Duty* | depends on variable 7 |

FIG 8

| Object Type | Occurence Number | Character Position | Text | Other Info |
|---|---|---|---|---|
| variable | 1 | 345-355 | *Date:Agreement* | unknown variable |
| conditional | 2 | 23-44 | "*[This agreement is made the {Date:Agreement}]]*". | no known usage rule<br><br>syntax error – missing or extra nesting character |
| usage rule | 4 | 45-65 | *((Jurisdiction = "England and Wales") AND ((Date:Agreement <= 1.1.2002) XOR (Purchase:Price NOT >=MIN( Risk Threshhold, Term:Agreement \* Purchaser:Credit* | syntax error – missing brackets<br><br>no known conditional<br><br>unknown variable - Risk Threshhold |
| calculation | 4 | 345-365 | *Purchase:Price +Date:Agreement* | variable mismatch error |

FIG 9

SYSTEMS, METHODS AND COMPUTER PROGRAMS FOR ANALYSIS, CLARIFICATION, REPORTING ON AND GENERATION OF MASTER DOCUMENTS FOR USE IN AUTOMATED DOCUMENT GENERATION

CROSS REFERENCE TO RELATED APPLICATION

This application claims priority to U.S. Provisional Patent Application No. 60/379,884 entitled "Systems, Methods and Computer Programs for Analysis, Clarification, Reporting on and Generation of Master Documents for Use in Automated Document Generation" and filed on May 10, 2002. The disclosure of the above-described filed application is hereby incorporated by reference.

FIELD OF THE PRESENT INVENTION

The present invention relates generally to computer-implemented document processing. In particular, but not exclusively, the present invention relates to systems, methods and computer programs for analysis, clarification, reporting on and generation of master documents for use in automated document generation.

DESCRIPTION OF THE RELATED TECHNOLOGY

Manual approaches to deriving customized documents from master documents (sometimes also referred to as precedents, standards, forms (or some combination thereof), templates, masters, master contracts, master agreements and henceforth referred to as masters) are known and commonly used. A particular example is that of a lawyer using a legal precedent to draft a legal document such as a contract.

Automated document generation systems are becoming increasingly important. By automated document generation systems we do not mean merely the use of a word processor to edit a master, which is essentially still a manual approach, but the use of computer systems to automatically generate a customized document from an automated master using information supplied from an electronic database and/or information provided by a user answering an electronic questionnaire.

With automated document generation systems (sometimes also known as document assembly systems), the generated documents are sometimes known as document instances or customized documents, hereinafter referred to as customized documents. The automated entities from which the customized documents are generated are sometimes known as automated masters or automated document templates, hereinafter referred to as automated masters. Automated masters are often, but not always, derived from masters used manually with a word processor, hereinafter referred to as manual masters.

Automated document generation systems are specifically intended to eliminate the need for, or at least reduce the input required from, a knowledge expert (such as a lawyer) when deriving customized documents (such as contracts) from masters. Thus, whereas a knowledge expert can recognize and make allowance for missing information and inaccuracies in manual masters while manually deriving customized documents, it is clearly essential that automated masters are accurate, complete and error-free. The potentially serious consequences of generating customized documents from error-ridden automated masters need hardly be stated. Conventionally, however, the creation of accurate and error-free automated masters is a highly complex, expensive, time-consuming and error-prone task.

Where automated masters are derived from manual masters, the first step is for the knowledge expert to identify and supply any information missing from the manual master and to identify and correct any errors in the manual master. The result of this first step will henceforth be referred to as a clarified master. In some cases a manual master will already be complete and error free. Clearly, in these cases, the clarified master and the manual master are one and the same thing. Conversely, if an existing manual master is clarified, then the clarified master is still a manual master (albeit, an improved one) and is still capable of being used to manually derive customized documents.

Clarified masters generally comprise text that is always included in the customized documents plus a number of different elements including: 1) data variables which may be given values by a user when generating a customized document (such as a variable for the date of agreement to be set out in a clause of a contract); 2) control variables which do not themselves appear in the customized document but which nevertheless require a value to be provided by a user to generate a fully customized document (such as a variable specifying the law applicable to a contract the value of which is required to determine which of a selection of alternate applicable law clauses to include in the generated contract); 3) the conditional content itself for possible inclusion when generating a customized document (such as the text of alternate applicable law clauses); 4) logical usage statements which determine whether or not to include elements of conditional content when generating a particular customized document and which depend on the value of control variables and/or also possibly data variables; and 5) user guidance or help for presenting to a user in an electronic questionnaire for capturing the information required to generate a fully or partially customized document; and other elements. Typically, some form of mark-up notation is used in the clarified master to denote these different elements and to define how they interrelate.

Data variables may have predefined acceptable formats or ranges of values which may be specified in the clarified master. Also, the logical usage rules may be simple logical statements such as Jurisdiction IS "Delaware" or more complex statements composed of a plurality of combined logical statements, possibly including mathematical operations and other functions, such as Jurisdiction IS "Delaware" AND (Date: Agreement IS EARLIER THAN 1.1.2002 OR PurchasePrice IS LESS THAN MINIMUM OF (RiskThreshhold, Term: Agreement*Purchaser:Credit)). Furthermore, conditional content and/or data variables may be nested within further conditional content to an arbitrary number of nesting levels.

Conventionally, the generation of an automated master from a clarified master requires the manual creation of one or more intermediate programming documents, often referred to as templates. Typically, but not always, these intermediate programming templates consist of a questionnaire template and a document template and are required in order to specify the content and behavior of the electronic questionnaire and the associated customized document in a computer programming style notation that can be interpreted or compiled by the conventional document automation system. Even though the clarified master contains all the necessary information, conventional document automation systems are normally not capable of acting upon this information directly.

While the creation and clarification of manual masters requires "merely" the skill of the knowledge expert in the particular field of the master (such as a specialist lawyer) for conventional document automation systems, information technology or computer programming skills are also required when creating the questionnaire programming templates and document programming templates. However, the skills of a knowledge expert (such as a specialist lawyer) and of an information technology expert are rarely present in one individual and thus a team of experts is normally required when creating conventional automated masters. Liaison between the individual experts is time-consuming and error-prone. While the knowledge expert might understand what the master is intended to mean (the semantics of the master) and the information technology expert might understand how to define and structure the component elements (the syntax of the templates), communication between these differently-skilled experts is a problem and can result in misunderstandings, errors, delay and additional cost.

Although conventional questionnaire and document programming templates may be laboriously created from scratch by a suitably skilled or qualified team of experts, more often the templates will be derived from existing manual masters already used in manual document drafting. For example, legal publishing houses and law firms have substantial investment in existing legal precedents, whether in print or electronically stored media. These existing legal precedents are not suitable for use as masters in conventional automated document generation systems without conversion into document and questionnaire templates. The process of converting these existing precedents into programming templates suitable for automated document generation systems is an immense task again requiring the dual skills of knowledge expert and information technology expert. For example, an information technology expert cannot be relied on and is not expected to be able to generate the programming templates from the legal precedent for use in conventional automated document generation without input from the lawyer.

Additionally, existing manual masters often contain minor errors or inaccuracies which would not trouble the manual drafting of a customized document by a knowledge expert, but which, if not spotted when creating a master for automated document generation, could cause significant problems. For example, the omission of a single left or right bracket used to denote nested conditional text in a clause of a contract precedent may not even be noticed by a lawyer who naturally understands the intent of the clause. However, when creating an automated master, this minor error might result in the entire clause being ambiguous, with uncertain consequences in the customized document generated from that automated master.

A further problem for organizations wishing to convert existing manual masters into automated masters for use in automated document generations systems is that existing masters are often written in a variety of different styles. For example, different legal publishing houses and different law firms typically have their own unique "house style". One style of legal precedent might use "This agreement is made the . . . day of . . . " to indicate a single variable (i.e. the date of agreement), whereas another style may use "This agreement is made on [ ]" and yet another style may use "This agreement is made the {Date:Agreement}". These legal clauses are semantically identical although syntactically different. The conversion of existing legal precedents in different styles into automated masters requires knowledge of each particular style. This again requires the skill of the knowledge expert who must interpret the different house styles for the information technology expert, so that accurate and error-free programming templates may be created.

Furthermore, many of, if not most of, the "house styles" of existing legal precedents have an inherently ambiguous syntax. For example, while square brackets "[ ]" may be used to denote a space for missing information to be supplied (i.e. a data variable), they are commonly also used to denote conditional text, for example "'the Purchase Price' means the sum of [ ] [which is [inclusive] [exclusive] of value added tax at the standard rate as at the date of actual completion]". Again, it is the knowledge expert who must resolve the syntactical ambiguities in a style for the information technology expert, so that accurate and error-free programming templates may be created.

While the creation of automated masters, whether from scratch or converted from existing manual masters, is a highly complex, expensive, time-consuming and error-prone task, that is not the end of the problems. Once created, the manual master, the document template and the questionnaire template still all need to be separately maintained to be kept up to date and be kept consistent. This is especially important with legal document generation where maintenance is required to keep both the legal precedent and the document and questionnaire templates up to date with changes in law and practice. However, yet again, the task of maintenance requires the dual skills of the knowledge expert and the information technology expert and is thus itself a highly complex, expensive, time-consuming and error-prone task.

This task of keeping the automated system current is made more difficult and time consuming because of the need to keep the document and questionnaire templates consistent between themselves (particularly that the behavior of the questionnaire exactly reflects all of the inter-dependencies in the master), and to keep both of them consistent with the legal intent of the manual master. In the case of a legal system, since the lawyer is not skilled at reading the computing notation of the document and questionnaire templates the lawyer will continue to use the manual legal precedent as the legal reference for the automated system, both for the current version of the master and as the legal precedent to update with future changes to the law. It is not hard to see the potential for confusion, uncertainty and lack of consistency where these three documents are maintained by separate experts, neither of whom are expert in the other's notation, and where this lack of expertise may lead to lack of trust. Note that this problem is exacerbated if the questionnaire and document templates use different computing notations requiring two information technology experts in addition to the lawyer. A further consequence of the lawyer not being able to rely on the information technology experts' interpretation of the legal precedent, and of the lawyer not being able to verify the correctness of the templates through inspection, is the necessity for the lawyer to test the resulting automated master in an attempt to establish that the customized documents are correctly generated by the document generation system. It is not hard to see the magnitude of the testing task confronting the lawyer where the automated master has more than a very few number of control variable questions, with the resulting combinatorial "explosion" of permutations of possible customized documents. For anything but the simplest of masters the lawyer will most likely only have time to test a few permutations in advance of operational use, with the consequential natural reluctance on the part of the lawyers using the document generation system to trust the generated customized documents knowing that the majority of possible customized documents can not have been verified in advance. The consequential need for the knowledge expert to verify each customized document after generation undermines the principal justification for automated document generation and severely limits its scope for widespread deployment.

SUMMARY OF CERTAIN INVENTIVE ASPECTS

A general object of certain embodiments of the present invention is to ameliorate the above-described problems in creating and maintaining masters for use in automated document generation systems.

Another object of certain embodiments of the present invention is to provide a computer system for the creation of accurate and error-free automated masters either from scratch or from existing manual masters, and for the maintenance of masters in an accurate and error-free form.

Another object of certain embodiments of the present invention is to provide a computer system for creating automated masters, either from scratch or from existing manual masters, and for maintaining automated masters, which reduces or eliminates the need for information technology expertise, thereby saving time and expense and reducing the risk of errors.

Another object of certain embodiments of the present invention is to provide a computer system for the analysis, auditing and quality assurance of manual masters to identify unknown elements and highlight errors, inaccuracies or ambiguities and to generate corresponding reports.

Another object of certain embodiments of the present invention is to provide a computer system for prompting a knowledge expert to provide clarification in respect of an error-ridden, inaccurate or ambiguous manual master to enable the generation of a quality assured clarified master.

Another object of certain embodiments of the present invention is to provide a computer system for fully automatically creating an automated master from a clarified master thereby eliminating the need for intermediate programming templates and as a consequence eliminating the time, cost and errors inherent in manually programming and testing those templates.

Another object of certain embodiments of the present invention is to provide a computer system for the analysis and automation of manual masters in a plurality of different "house styles" which reduces the need for knowledge of the various "house styles", thereby saving time and expense and reducing the risk of errors.

Another object of certain embodiments of the present invention is to provide an automated document generation system which enables the generation of customized documents from existing masters written in a plurality of different styles or mark-up notations.

Another object of certain embodiments of the present invention is to provide a computer system for analyzing manual masters written in one style or mark-up notation, and for translating or regenerating the manual masters into a different style or markup notation.

Another object of certain embodiments of the present invention is to provide a computer system for reviewing the inter-dependency between different elements of an automated master.

According to a first aspect of the present invention there is provided a method of generating data representing a master document for use in an automated document generation system, the method comprising storing data representing a first mark-up notation or style and data representing a second mark-up notation or style different to the first markup notation or style, storing data representing a mapping between the first and second markup notations or styles, receiving data representing a precedent or master document written in the first mark-up notation or style, analyzing the received data, in dependence on the data representing the first mark-up notation or style, to determine component elements of the first precedent or master document and the interrelationships of the component elements, on the basis of the analysis and in dependence on the data representing the mapping and the data representing the second mark-up notation or style, generating data representing a precedent or master document written in the second mark-up notation or style, and outputting the generated data.

Preferably the mapping comprises a meta-level definition of a plurality of types of component elements of master documents or precedents. Preferably, the analysis identifies component elements by type. In one embodiment, the component element types including control or data variables, elements of conditional content and usage conditions for the elements of conditional content.

Preferably, the analysis first identifies any control or data variables in the precedent or master document and then identifies any elements of conditional content. As a practical rule, the experience of the applicants shows that this approach is more effective correctly identifying different types of component elements where the first mark-up notation or style is inherently ambiguous.

Preferably, the analysis generates a database of component elements indicating their identified type and their position within the precedent or master document.

Preferably, the data representing the first mark-up notation or style includes definitions of a character representation and positioning of different types of component elements. Similarly, the data representing the second mark-up notation or style preferably includes definitions of a character representation and positioning of different types of component elements.

According to a second aspect of the present invention there is provided a method of analyzing data representing a precedent or a master document for use in an automated document generation system, the method comprising:
    storing data representing a mark-up notation or style;
    receiving data representing a precedent or master document written in the mark-up notation or style;
    analyzing the received data to determine component elements of the precedent or master document and the interrelationships of the component elements, in dependence on the data representing the mark-up notation or style;
    determining whether there is any unknown information relating to component elements of the precedent or master document; and
    determining whether there are any errors or ambiguities in component elements of the precedent or master document or in their interrelationships.

Preferably the data representing a mark-up notation or style is itself represented in a meta-level definition which identifies a plurality of component element types.

In one embodiment, the method includes generating data representing a report document, the report document indicating different types of component elements of the precedent or master document and interrelationships between component elements of the precedent or master document.

Preferably, the report document represents the different types of component elements of the precedent or master document in the form of differently colored regions overlaid on the precedent or master document such that the content of the precedent or master document remains visible. The different types of component elements may include different levels of nesting of conditional content and differently colored regions may represent the different levels of nesting. Preferably, differently colored regions for more deeply nested levels overlay differently colored regions for less deeply nested levels.

In another embodiment, the method further comprises generating a user interface to capture unknown information relating to component elements or information resolving errors or ambiguities in any component elements or in their interrelationships; and on the basis of the captured information and the data representing the precedent or master document, generating data representing a clarified or partially clarified precedent or master document.

In some embodiments, the unknown information relating to component elements comprises unknown variables or unknown usage conditions for elements of conditional content.

In some embodiments, the errors or ambiguities are errors or ambiguities in the syntax of usage conditions for elements of conditional content.

According to a third aspect of the present invention there is provided a method of generating a master document for use in an automated document generation system from an existing precedent for use in manual document generation, the method comprising:

storing data representing a first mark-up style or notation of existing precedents for use in manual document generation and data representing a second mark-up style or notation of master documents for use in an automated document generation system;

receiving data representing an existing precedent for use in manual document generation written in the first mark-up style or notation;

analyzing the received data in dependence on the data representing the first mark-up style or notation to identify in the existing precedent one or more component elements including control or data variables, elements of conditional content for possible inclusion in a customized document to be generated, and logical usage rules for determining whether or not to include elements of conditional content in dependence on control or data variables; and generating, on the basis of the analysis and on the basis of the second mark-up notation or style, data representing a master document for use in automated document generation, the master document being written in the second mark-up style or notation.

Preferably the data representing the first or second mark-up notations or styles are themselves represented in a meta-level definition which identifies a plurality of component element types.

Preferably, the analysis first identifies any control or data variables in the precedent or master document and then identifies any elements of conditional content. As a practical rule, the experience of the applicants shows that this approach is more effective correctly identifying different types of component elements where the first mark-up notation or style is inherently ambiguous.

Preferably, the analysis generates a database of component elements indicating their identified type, position within the precedent or master document and any references component elements have to each other.

Preferably, the data representing the first mark-up notation or style includes definitions of a character representation and positioning of different types of component elements. Similarly, the data representing the second mark-up notation or style preferably includes definitions of a character representation and positioning of different types of component elements.

According to a fourth aspect of the present invention there is provided an automated document generation method comprising generating a customized document on the basis of an existing precedent for use in manual document generation, the method comprising:

receiving data representing an existing precedent for use in manual document generation generating data representing a master document for use in automated document generation using the method of the third aspect of the present invention; and generating a customized document using the generated master document.

According to a fifth aspect of the present invention there is provided a computer system comprising:

a first data base arranged to store data representing a first mark-up notation or style, data representing a second mark-up notation or style different to the first markup notation or style and data representing a mapping between the first and second mark-up notations or styles;

an input interface for receiving data representing a precedent or master document written in the first mark-up notation or style;

a processing module arranged to analyze the received data to determine component elements of the first precedent or master document and the interrelationships of the component elements, the analysis being in dependence on the data representing the first mark-up notation or style;

a processing module arranged to generate data representing a precedent or master document written in the second mark-up notation or style on the basis of the analysis and in dependence on the data representing the mapping and the data representing the second mark-up notation or style; and an output interface for outputting the generated data.

According to a sixth aspect of the present invention there is provided a computer system for analyzing data representing a precedent or a master document for use in an automated document generation system, the computer system comprising:

a data base arranged to store data representing a mark-up notation or style;

an input interface for receiving data representing a precedent or master document written in the mark-up notation or style;

a processing module arranged to analyze the received data to determine component elements of the precedent or master document and the interrelationships of the component elements, in dependence on the data representing the mark-up notation or style;

a processing module arranged to determine whether there is any unknown information relating to component elements of the precedent or master document; and a processing module arranged to determine whether there are any errors or ambiguities in component elements of the precedent or master document or in their interrelationships.

According to a seventh aspect of the present invention there is provided a computer system for generating a master document for use in an automated document generation system from an existing precedent for use in manual document generation, the computer system comprising:

a database arranged to store data representing a first mark-up style or notation of existing precedents for use in manual document generation and data representing a second mark-up style or notation of master documents for use in an automated document generation system;

an input interface for receiving data representing an existing precedent for use in manual document generation written in the first mark-up style or notation;

a processing module arranged to analyze the received data in dependence on the data representing the first mark-up style or notation to identify in the existing precedent one or more one or more component elements including control or data variables, elements of conditional content for possible inclusion in a customized document to be generated, and logical usage rules for determining whether or not to include elements of conditional content in dependence on control or data variables; and a processing module arranged to analyze generate, on the basis of the analysis and on the basis of the second mark-up notation or style, data representing a master document for use in automated document generation, the master document being written in the second mark-up style or notation.

Other aspects and embodiments or the present invention will be apparent from the following description including its Appendices. There now follows, by way of example only, a detailed description of certain inventive embodiments.

BRIEF DESCRIPTION OF THE DRAWINGS

FIG. 1a shows a possible arrangement of data processing means and communication means for implementing an automated document generation system.

FIG. 7 shows embodiments of the data flows for analyzing a master or precedent and for generating a new master or precedent.

FIG. 8 is a database representation of a master or precedent as analyzed by one embodiment of the computer program or system.

FIG. 9 is a database representation of a master or precedent as analyzed by one embodiment of the computer program or system.

DETAILED DESCRIPTION OF CERTAIN INVENTIVE EMBODIMENTS

In an automated document generation system, a server computer runs a document generation program and is capable of communicating with local or remote client computers over a local area network (LAN) or wide area network (WAN) such as the Internet. A master document is created as a Microsoft Word document constructed in a predefined mark-up notation or style—namely a three column tabular format with a defined syntax for variables, conditional content, logical usage rules and so on. Creation of the master document requires the input of both the knowledge expert and the information technology expert. The master document is first translated into a form suitable for processing by the document generation program. The document generation program uses the object linking and embedding interfaces of Microsoft Word to interrogate the master document to determine its structure and content and to determine the further information needed to generate a fully customized document. When instructed to generate a customized document, the server first generates one or more Web page questionnaires which are sent to client computers for user input of the further information required. Users may then submit the further information to the server using their Web browsers. Once all the required further information has been captured, the server generates a customized document on the basis of the master document and received further information.

Figure 1B:
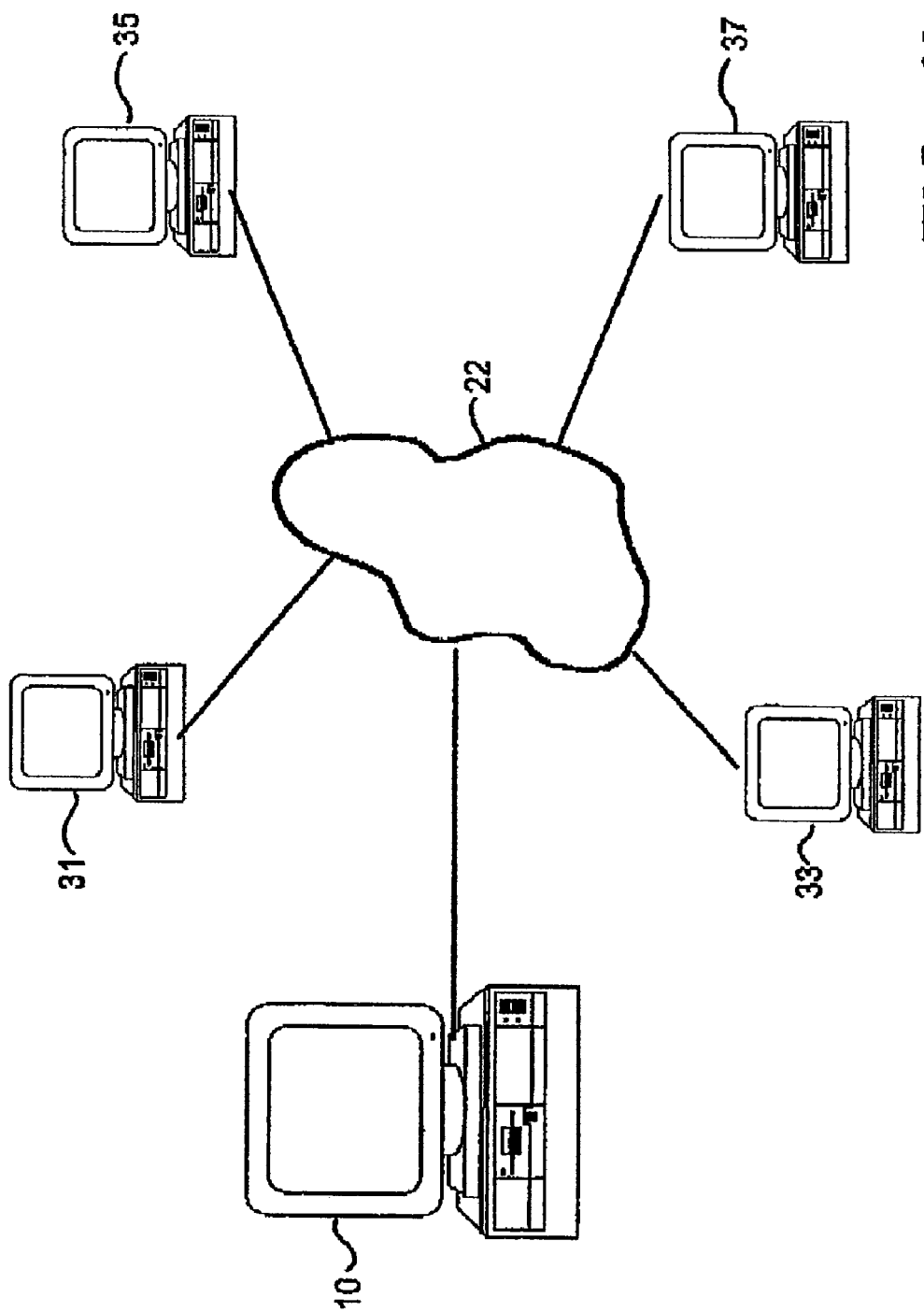
FIG. 1b shows an alternative possible arrangement of data processing means and communication means for implementing an automated document generation system.
Figure 2:
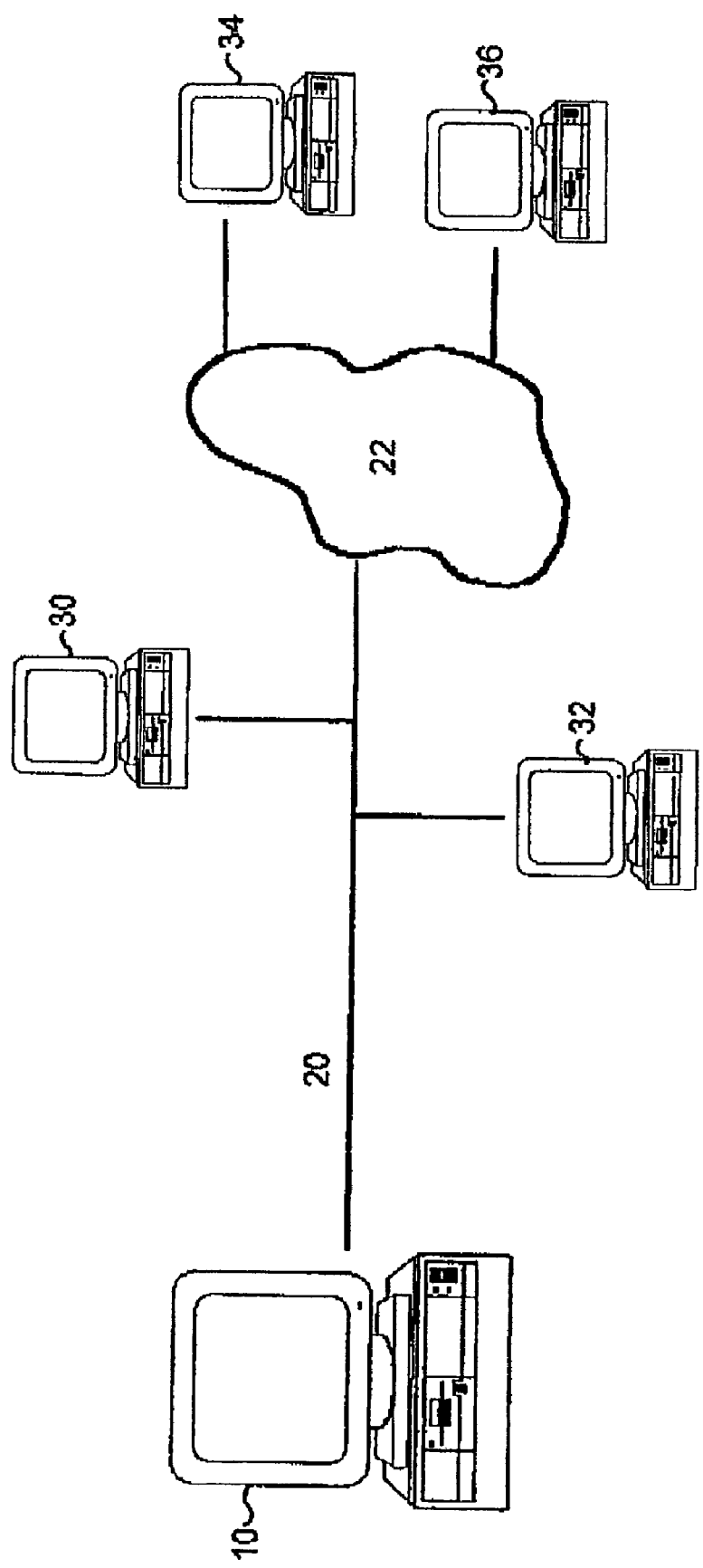
FIG. 2 shows a further alternative possible arrangement of data processing means and communication means for implementing an automated document generation system.

The automated document generation system can be implemented using one or more data processing means. Where more than one data processing means are used, they are connected together using communication means. Client/server architecture is used. One of the data processing means functions as a server and the other data processing means function as clients. If the automated document generation system is implemented using one data processing means, the single data processing means functions as both server and client. FIGS. 1a, 1b and 2 show typical arrangements of data processing means and communication means for implementing the automated document generation system.

FIG. 1a shows a server computer 10 connected to two local client computers 30 and 32 by means of a local area network (LAN) 20. Each computer 10, 30 and 32 runs an operating system program such as Microsoft NT and network programs such as Novell Netware. The server computer 10 also runs a Web server application such as Microsoft Internet Information Server. Each of the local computers 30 and 32 also run a browsing application such as Microsoft Internet Explorer. Server computer 10 and local computers 30 and 32 communicate with each other using Transmission Control Protocol/Internet Protocol (TCP/IP) and HTTP. Together, server computer 10, local computers 30 and 32, and LAN 20 form an intranet.

FIG. 1b shows server computer 10 connected to four client computers 31, 33, 35 and 37, which may be local or remote, by means of connections to the Internet 22. Each computer 10, 31, 33, 35 and 37 runs an operating system program such as Microsoft NT and network programs such as Novell Netware. The server computer 10 also runs a Web server application such as Microsoft Internet Information Server and is arranged to accept and respond to client requests from the Internet 22. Each of the computers 31, 33, 35 and 37 also run a browsing application such as Microsoft Internet Explorer. Server computer 10 and computers 31, 33, 35 and 37 communicate with each other using Transmission Control Protocol/Internet Protocol (TCP/IP) and HTTP.

FIG. 2 shows a server computer 10 connected to two local client computers 30 and 32 using a LAN 20 and also connected to two remote client computers 34 and 36 through the Internet 22. Each computer 10, 30 and 32 runs an operating system program such as Microsoft NT and network programs such as Novell Netware. Server computer 10 also runs a Web serving application such as Microsoft Internet Information Server. Each of client computers 30, 32, 34 and 36 also run a browsing application such as Microsoft Internet Explorer.

Proxy servers and firewalls (not shown) may be used to protect the intranet from unauthorized access from computers connected to the Internet 22. Server computer 10, local computers 30 and 32 and remote computer 34 and 36 communicate with each other using TCP/IP and HTTP.

Henceforth in this document, the arrangement of computer systems and communication means as described above with reference to FIG. 2, being the most general of the arrangements described above, will be used to describe embodiments of the automatic document generation system.

One or more of the computer systems 10, 30, 32, 34 and 36 runs a word processing application such as Microsoft Word. Microsoft Word is used to create and maintain standard documents and may be used to view the customized documents generated. As will be described below in greater detail, the standard document consists of known information, and logical rules for determining, on the basis of further information to be captured, how to use items of known information when generating the customized document. The standard document may also contain user guidance. Standard documents should generally conform to a standard structure.

Furthermore, one or more of computer systems 10, 30, 32, 34 and 36 runs a translator program, described in detail below, for converting document files in the Microsoft Word format into a format suitable for processing by the document generation program.

Further, server computer 10 also runs the document generation program, mentioned above and described in greater detail below, which is used to generate information-capturing documents, capture at least part of the further information and generate the customized document.

Translator Program

The main function of the translator program is to convert standard documents in Microsoft Word format into a format suitable for processing by the document generation program. This format is either Prolog source code stored in an ASCII (American Standard Code for Information Interchange) file format or a compiled object file of the Prolog source code. Prolog is a standard programming language whose syntax is defined by the International Standards Organization (ISO). Prolog is a language useful for developing rule-based applications or systems.

Figure 3:
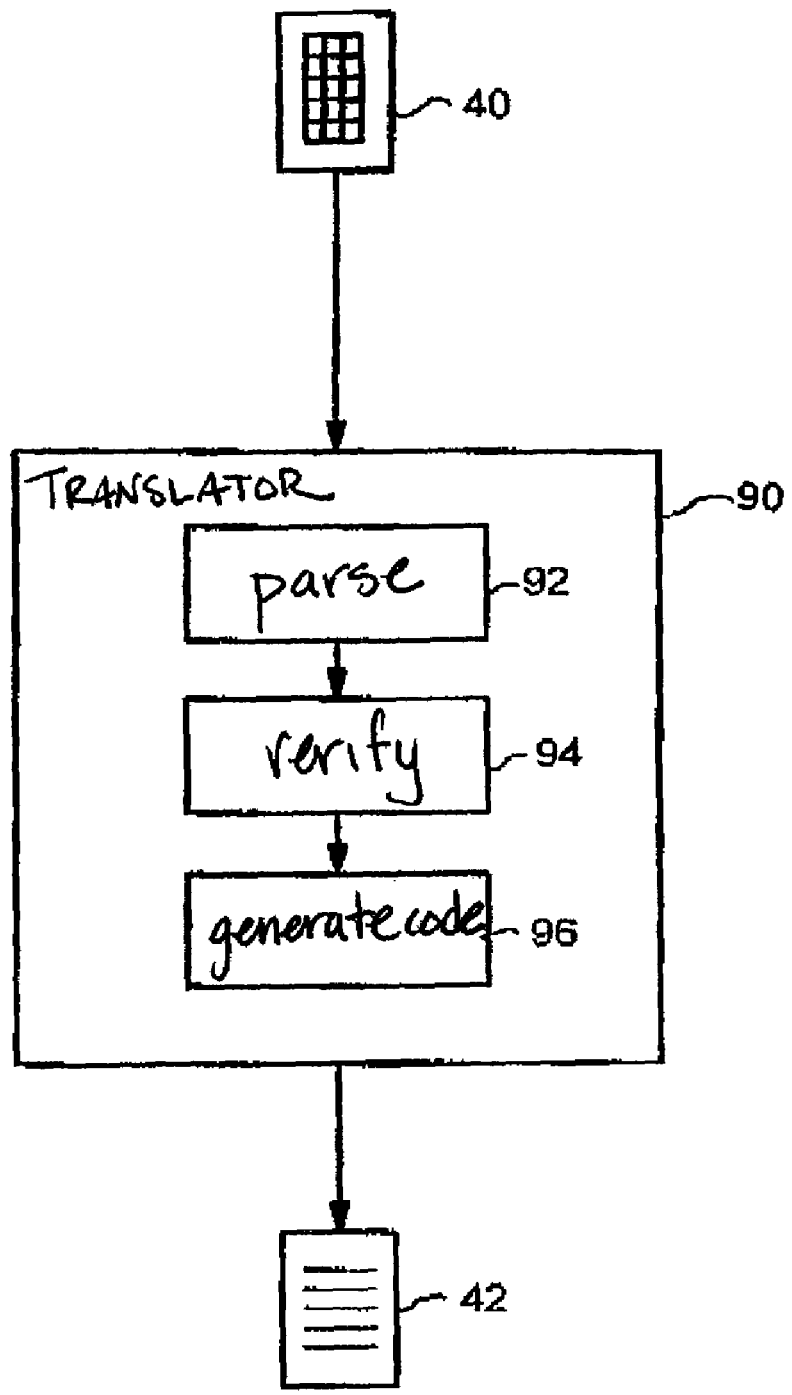
FIG. 3 shows the functional components of a translator program.

The functioning of the translator program will now be described with reference to FIG. 3. A standard document 40, created and maintained using Microsoft Word, must conform to a standard structure described in detail below. Using a representation of this structure, translator program 90 is able to create an Prolog source code image of the information contained in standard document 40.

Translator program 90 comprises three main components a parsing component 92; a verifying component 94; and a code generating component 96. Parsing component 92 uses the object linking and embedding (OLE) capabilities of Microsoft Word to interrogate a standard document 40 supplied to it. In doing this, parsing component 92 acts as a master process and invokes Microsoft Word as a slave process. Parsing component 92 uses a representation of the standard structure of all standard documents to extract the various parts of the standard document 40. The data resulting from this process is then sent to the verifying component 94.

The verifying component 94 recognizes common items in the data supplied by the parsing component, such as repeated variable names representing items of further information to be captured, and associates them together. Verifying component 94 also checks for errors and inconsistencies in the parsed data. Errors might arise, for example, if there are inconsistencies in the logical rules of the standard document, or mismatched use of variables. Each error is identified and logged to a reporting file. If there are no errors detected by verifying component 94, the result is passed to the code generating component 96.

The code generating component 96 takes the parsed and verified data obtained by interrogating the standard document and generates, according to the known syntax, a Prolog source code program file 41, suitable for processing by the document generation program. The Prolog source code of document 41 is thus an image of the information contained in the standard document 40 which has merely been translated into a format suitable for execution.

While performing its main function of generating an image, the translator program also stores versions of each of the known information units of the standard document 40 (for example, formatted text for possible inclusion in the customized document) in Rich Text Format (which is given the file extension RTF) within source code program 42. These RTF versions are used later by the document generation program when generating the customized document in RTF format. The translator program achieves this by interrogating the standard document 40 using the OLE capabilities of Microsoft Word, in particular the capability to obtain RTF translations of portions of a document in Microsoft Word format.

Document Generation Program

The purpose of the document generation program is to generate information-capturing documents, capture at least part of the further information, and generate customized documents according to instructions from a user. To do this the user specifies a standard document which has been translated using the translator program described above. The document generation program is run as a server program and is instructed to perform tasks by users of client browser applications, such as the browser application Microsoft Internet Explorer.

Figure 4A:
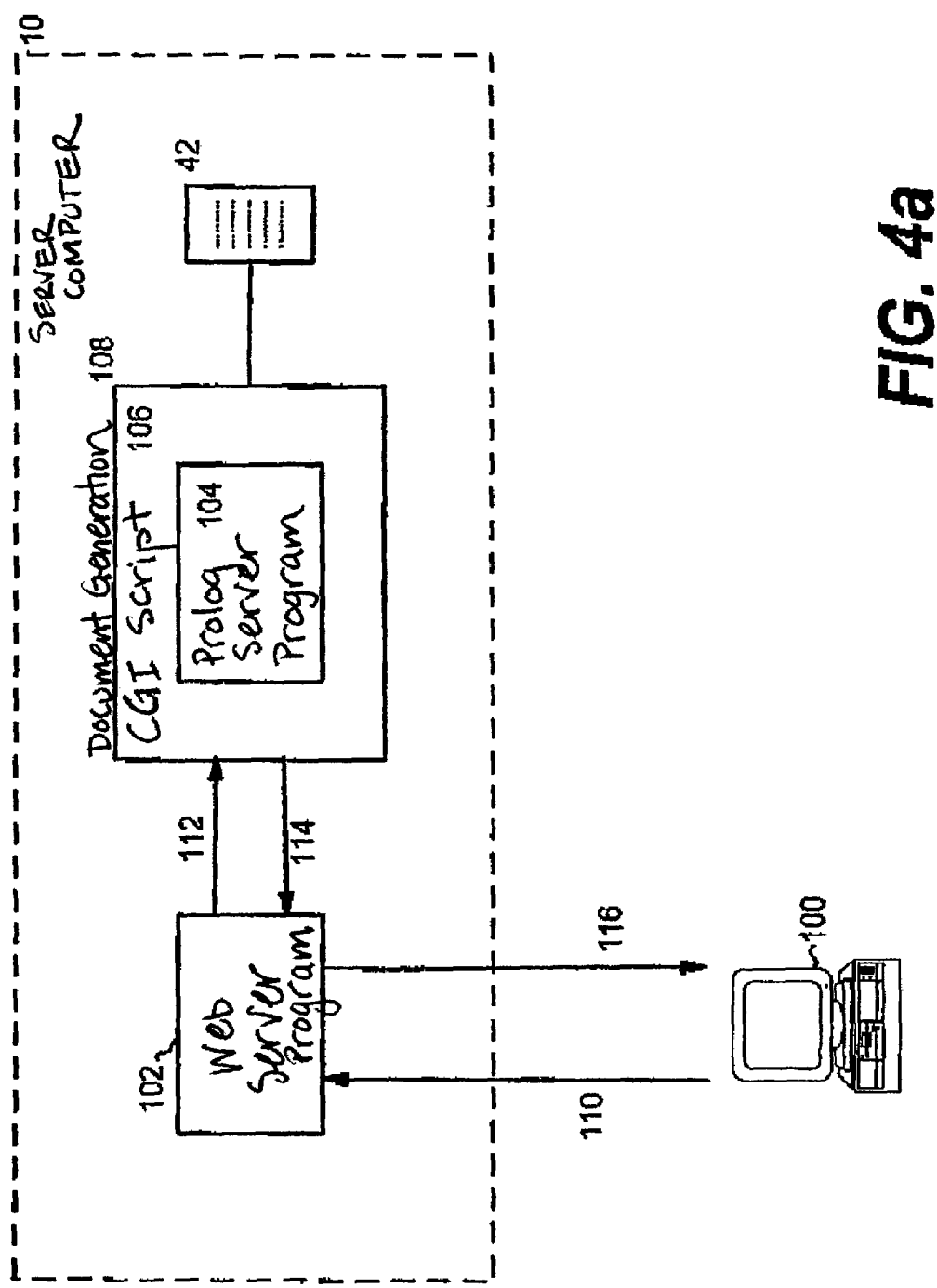
FIG. 4a shows the client/server architecture used to implement a document generation program.

FIG. 4a shows the client/server architecture used to implement the document generation program. Document generation program 108 is composed of a Prolog server program 104, described below, with a Common Gateway Interface (CGI) script 106 providing the interface between a Web server program 102, such as Microsoft Internet Information Server, and the Prolog server program 104. Client computer 100 runs a browsing application, such as Microsoft Internet Explorer, and is connected to server computer 10 through communication means. A user of client computer 100 instructs document generation program 108 to perform a task by passing a uniform resource locator (URL) request to the Web server program 102 of server computer 10 at step 110.

The URL request may be made by the user of client computer 100 typing a request in to the address field of the browser application or clicking on a button in a Web page displayed by the browser application which has been set up automatically to perform the URL request. The URL request will generally contain the network address of server computer 10, followed by the directory and file name of the CGI script 106 and then various instructions and/or data in the form of a query string to be passed to Prolog server program 104 for execution. The Web server application 102 receives the URL request from client computer 100 and passes the instructions and/or data to the Prolog server program 104 at step 112 through the CGI script interface 106.

With reference to FIG. 4a, is to be understood that client computer 100 may be a computer with direct access to server computer 10 via an intranet or the Internet, as described above with reference to computers 30, 31, 32, 33, 35 and 37 of FIGS. 1a and 1b, or it may be a computer with no direct access to server computer 10, as described above with reference to computers 34 and 36 of FIG. 2. In the latter case, to enable a remote computer 100 to pass a URL request to server computer 10, the URL request is sent in the form of an e-mail to a predetermined e-mail address of a router computer (not shown) directly connected to server computer 10 which demultiplexes the e-mail and automatically forwards the encapsulated URL request to server computer 10 for processing. The router computer acts as a proxy client to server computer 10 and a proxy server to client computer 100. From the point of view of client computer 100 and server computer 10 the client/server request-response transaction remains essentially the same in both cases. The router computer runs an operating system, such as Unix, and a router program arranged to demultiplex e-mails and forward encapsulated URL requests as described above.

Alternatively, where client computer 100 has direct access to server computer 10, but the information-capturing document is forwarded from client computer 100 to a further client computer (not shown) which does not have direct access to server computer 10, the URL request from the further client computer is sent in the form of an e-mail to a predetermined e-mail address of a router computer (not shown) directly connected to server computer 10. The router computer demultiplexes the e-mail received to extract the URL request and the e-mail address of client computer 100 (which is contained in the e-mail from the further computer) and automatically forwards to client computer 100 an e-mail informing the user of receipt of the response. The e-mail sent to client computer 100 further contains HTML code, activated by a push button for example, for automatically passing the URL request to server computer 10 for processing. When this URL request is passed to server computer 10, client computer 100 becomes the requesting client and server computer 10 will send its response to client computer 100 rather than the further computer. From the point of view of server computer 10 the client/server request-response transaction remains essentially the same as if the further information was captured using client computer 100. The router computer runs an operating system, such as Unix, and a router program arranged to demultiplex received e-mails, extract URL requests and forward to client computer 100 e-mails containing HTML code for passing the URL requests to server computer 10 as described above.

The Prolog server program 104 is implemented using Logic Programming Associates' ProWeb Server. The ProWeb Server is a program for developing and implementing Prolog applications which is capable of generating HTML and JavaScript. A detailed description of the ProWeb Server program is found in the ProWeb User's Manual available from Logic Programming Associates Ltd., Studio 4, RVPB Trinity Road, London SW18 3SX, UK incorporated herein by reference.

The ProWeb Server program is used to compile or execute the Prolog source code program 42, generated by the translator program, using the instructions and/or data passed from the user of client computer 100. The CGI script 106 may be regarded as a wrapper encapsulating Prolog server program 104.

Prolog server program 104 executes the specified Prolog source code program 42 on the basis of the user instructions and/or data contained in the URL request, and generates one or more Web pages in the form of HTML code and JavaScript in response. ProWeb Server uses incremental compilation techniques to compile relevant sections of the Prolog source code for execution as required.

Depending on the user's instruction and/or data, and any instructions contained in the Prolog source code program 42, the response generated by Prolog server program 104 will either be one or more Web pages constituting information-capturing documents or a Web page constituting a generated customized document. Also, depending on the user's instruction and/or data, and any instructions contained in the Prolog source code program 42, the Web page or pages generated by server program 106 will be sent to client computer 100 or to one or more further computers, connected to server computer 10 by communication means.

Where a computer, to which a Web page is to be sent, has direct access to server computer 10, the response is sent as a Web page to the IP address of the specified computer. Where, however, the computer has no direct access, the Web page response generated by server 10 is encapsulated in an e-mail and sent out to a specified e-mail address corresponding to the remote computer. Where no network or e-mail address is specified for a further computer, the Web page will be sent to the address of the client computer which initiated the client/server request-response transaction.

It will be described in detail below how document generation program 108 may generate responses, such as information-capturing documents, for distributing to and capturing further information from one or more further computers. However, for the purpose of describing the operation of document generation program 108 with reference to FIGS. 4a and 4b, it will presently be assumed that only one client computer, namely client computer 100, is involved in the client/server request-response transaction.

To generate a new customized document, the user of client computer 100 instructs document generation program 108 by passing a URL request specifying a Prolog source code file 42 corresponding to a particular standard document. Document generation program 108 initiates a session with the user of client computer 100. In generating a response to the user request, document generation program 108 accesses and incrementally compiles the Prolog source code file 42. Using the URL instructions and the Prolog source code program 42, document generation program 108 generates a Web form information-capturing document which is passed to the Web server application 102 via the CGI script interface 106 at step 114. At step 116, the server computer 10 sends the Web form information-capturing document to client computer 100.

The Web form information-capturing documents generated by document generation program 108 use the standard data-entry features of HTML described above to capture information from end-users browsing the Web form. When parts of the standard document included in an information-capturing document contain variables or other data representing further information to be captured, then the information-capturing document generated automatically includes appropriate data-entry items for inputting the required information corresponding to the variables, according to any specifications contained in the standard document, or, in default, according to the context of the variable in the standard document. JavaScript is embedded in the information-capturing documents to control, restrict or validate the information captured from a user. For example, JavaScript code may be used to check whether the information entered by a user fulfils specified criteria set out in the standard document. If the criteria are not fulfilled, error messages may be displayed and the user will be prevented from sending the invalid further information back to server computer 10.

Furthermore, standard "submit" features of HTML are used to generate code for automatically sending the captured information back to server computer 10 which is activated by a push button in the Web form information-capturing document (e.g. a "Submit" button). In the case of an embodiment wherein all client computers have direct access to server computer 10, as described above with reference to FIGS. 1a and 1b, the "Submit" button is arranged to pass a URL request to server computer 10 with the captured information and any other user instructions in the form of a query string.

In the case of an embodiment of the document generation system wherein some client computers may have direct access to server computer 10, but some may not, as described with reference to FIG. 2, the "Submit" button is arranged to encapsulate a URL request within an e-mail and send the e-mail to the router computer described above. In the latter case, the "Submit" button may alternatively be arranged to determine whether client computer 100 is has direct access to server computer 10 or not and then select whether to send the captured information and any other user instructions to server computer 10 in the form of a direct URL request or a URL request embedded in an e-mail accordingly.

Furthermore, standard "mail to" features of HTML may be used to generate code for forwarding the information-capturing document to a further computer for capturing further information from a further user. The code would be activated by a push button in the Web form information-capturing document (e.g. a "Mail To" button). It is optional to include a "Mail To" button and corresponding code in the information-capturing document. The option is specified in the instructions contained in the standard document. The information-capturing document is forwarded as an attachment to an e-mail sent to the e-mail address of the further user. The code may have a specified e-mail address (if one is specified in the standard document) or may query the user of client computer 100 for a forwarding e-mail address for the further user. The information-capturing document forwarded to the further computer will be identical to the information-capturing document first sent to client computer 100. Thus, it will contain push buttons for submitting captured information to server computer 10 and for forwarding the information-capturing document to a further computer as described above.

Once the response has been sent to client computer 100, the client/server request-response transaction is complete. However, the client/server session is not necessarily complete. A session is complete when one or more client/server transactions are completed which together result in the generation of a final customized document delivered to the client computer 100 or some other specified computer or printing device. In between transactions, document generation program 108 caches the state of the session to data storage means such as the hard disk of server computer 10. A unique session identifier is used to identify transaction requests received with previously cached sessions.

Further, document generation program 108 generates and maintains a historical database of all client/server request-response transactions using Microsoft Access. One use of the historical data is for exporting to an external document management system which may record details of all the stages in generating each particular customized document including amendment and version details. Another use of the historical data is to provide the ability for an end-user to return to an earlier stage in the generation of a customized document and restart the process from that point.

On receiving the Web form information-capturing document, the user of client computer 100 may enter some or all of the further information using data-entry items provided and send the information to document generation program 108 by clicking on the "Submit" button. If the captured data is sufficient for document generation program 108 to generate a customized document on the basis of the Prolog source code file 42 corresponding to the standard document, and if the standard document contains no other instructions for document generation program 108 to perform, then the customized document will be generated and a Web page, containing the customized document in HTML format and/or links for downloading the customized document in other formats, will be sent to client computer 100. The session with the user will then be complete. However, it is not necessary for the user to input all of the required data at once. If the captured data is not sufficient for document generation program 108 to generate a customized document (i.e. not all the further information required to generate the customized document has been captured), then a further Web form information-capturing document for capturing the further information required will be generated. The process of capturing the further information required will then continue as above.

The standard document may specify whether items of further information to be captured, for example variables, are required before a customized document can be generated. By default, items of further information are not required and the document generation program will generate a customized document on the basis of the standard document and partial further information, or even no further information, as best it can. For example, where further information representing a text or numeric variable is not required and has not been captured, the document generation program will leave blanks in the generated customized document at corresponding positions. Where, however, items of further information are specified in the standard document as being required, then no customized document will be generated until the further information has been captured by further information-capturing documents.

Prior to generating a customized document, document generation program 108 checks that the further information was captured using one or more information-capturing documents generated from Prolog source code program 42 and not from some other Prolog source code program. This is achieved by assigning unique identifiers to all Prolog source code programs and including the unique identifier of a particular Prolog source code program in all information-capturing documents generated from it. If the further information was captured using one or more information-capturing documents generated from some other Prolog source code program then no customized document will be generated. This is to prevent customized documents being generated from different standard documents or from different versions of a standard document, parts of which may be incompatible or out of date.

As mentioned above, the customized document generated by the document generation program may be sent to client computer 100 in HTML format. Additionally, or alternatively, a Web page containing links for downloading the customized document may be sent. Such a Web page contains embedded HTML code for sending a request to server computer 10, either as a URL request or an e-mail encapsulated URL request, to send the generated customized document back to client computer 100 in formats other than HTML. Other formats maybe Microsoft Word (which is designated by the file extension DOC), RTF or Adobe Acrobat format (which is designated by the file extension PDF). PDF format is preferred for the customized document because it provides a format that may be viewed and printed using any computer and printer system for which versions of the Adobe Acrobat Reader are available and installed. Further, it renders a printed document which is page for page identical with the viewed document which can also be completely locked and therefore unalterable by an end-user. The document files in formats other than HTML are sent using the File Transfer Protocol (FTP) with Multi-purpose Internet Mail Extension (MIME) headers to indicate the format of the document file to the browser application.

Figure 4B:
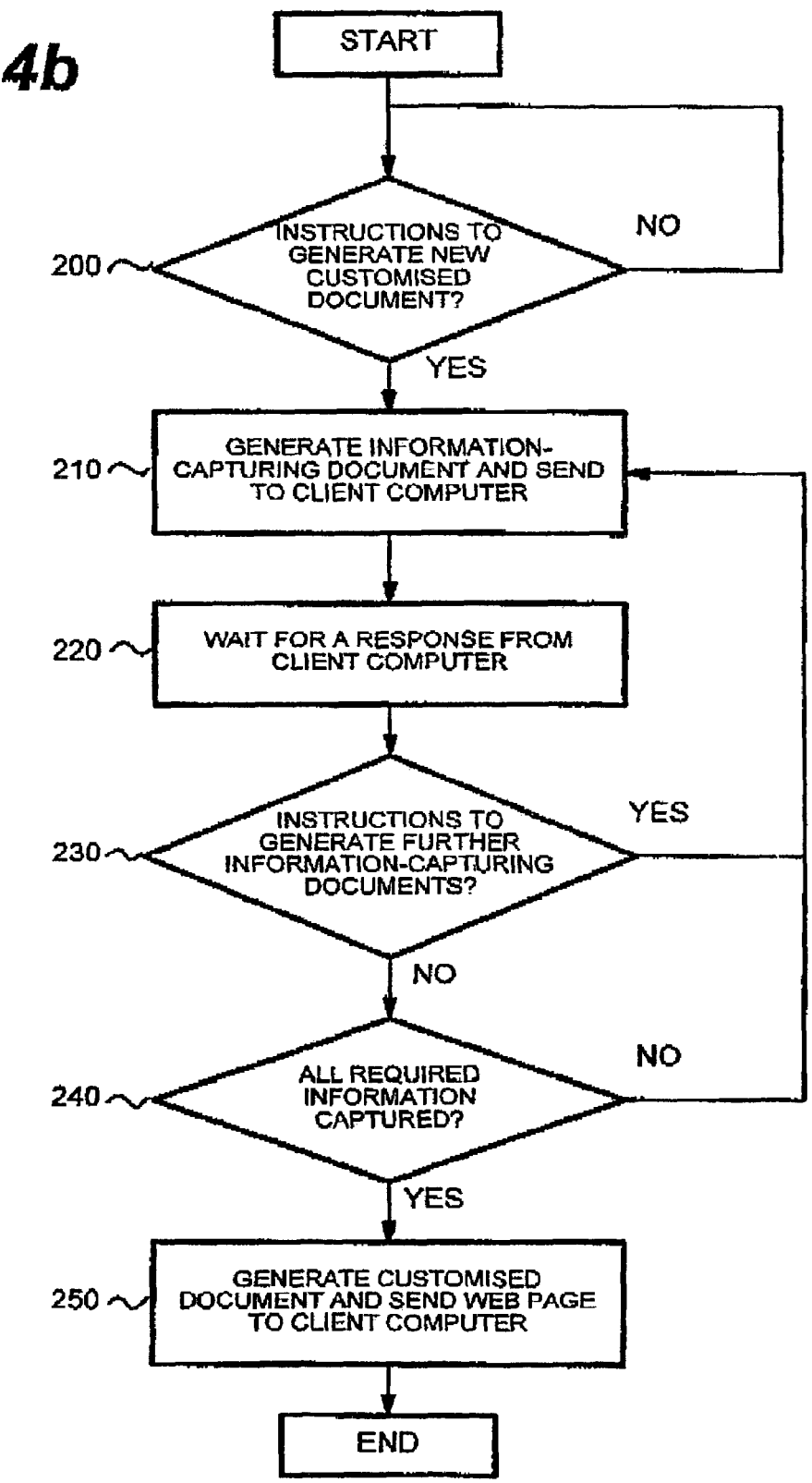
FIG. 4b is a flow diagram showing the process followed by a document generation program.

FIG. 4b is a flow diagram showing the process followed by document generation program 108 where server computer 10 interacts with client computer 100 in a session as described above. At step 200 server computer 10 waits for an instruction from client computer 100 to generate a new customized document. In response to receiving such an instruction, server computer 10 generates, at step 210, a first information-capturing document and sends it to client computer 100. An end-user of client computer 100 enters information and sends it to server computer 10 using the information-capturing document. At step 220 server computer waits for a response from client computer 100. When a response has been received, server 10 determines, at step 230, whether there are any further instructions to generate further information-capturing documents. These further instructions may be contained in the standard document as described in greater detail below, or in the response sent by client computer 100. If there are such instructions, server computer 10 proceeds to generate a further information-capturing document and sends it to client computer 100 at step 210. If not, server computer 10 proceeds to step 240 where it determines whether all the information required to generate the customized document (as specified in the standard document) has been received from client computer 100. If not, server computer 10 proceeds to generate a further information-capturing document at step 210 for capturing the further required information and sends it to client computer 100. If all the required further information has been received, the process continues to step 250 where server computer 10 generates the customized document and sends a Web Page to client computer 100.

U.S. patent application Ser. No. 10/347,785, entitled "DOCUMENT GENERATION" and filed on Jan. 20, 2003, hereby incorporated by reference in its entirety, describes enhanced functionality in automated document generation systems. In particular, it describes an automated document generation system capable of allowing a user, answering an electronic questionnaire to generate a customized document from a master, to defer certain questions or mark them as unsure, while still being able to generate a partially customized document, which may also be used as a further master in the automated document generation system. The partially customized document/master contains the markup or notation required to generate an electronic questionnaire for capturing the remaining information required to generate a fully customized document.

The automated generation program or system of the present invention is called DealBuilder and it employs the computer systems described above with respect to FIGS. 1 through 4 and U.S. patent application Ser. No. 10/347,785 to generate customized documents from master documents. In particular, the computer systems described with reference to FIGS. 1 to 3, 4a and 4b are used in DealBuilder. However, the main difference of DealBuilder over the system described above is that master documents are no longer created in the predefined mark-up notation or style as described. Instead, master documents or existing precedents, stored as simple Microsoft Word text files (although they may have auto numbering enabled), are first fed into a computer program or system called IntellX. IntellX is not an automated document generation system, but a system for analyzing, reporting on, or clarifying input master documents or existing precedents and generating new output master documents or precedents as well as generating data representing a master capable of being used by DealBuilder to generate customized documents.

Figure 5:
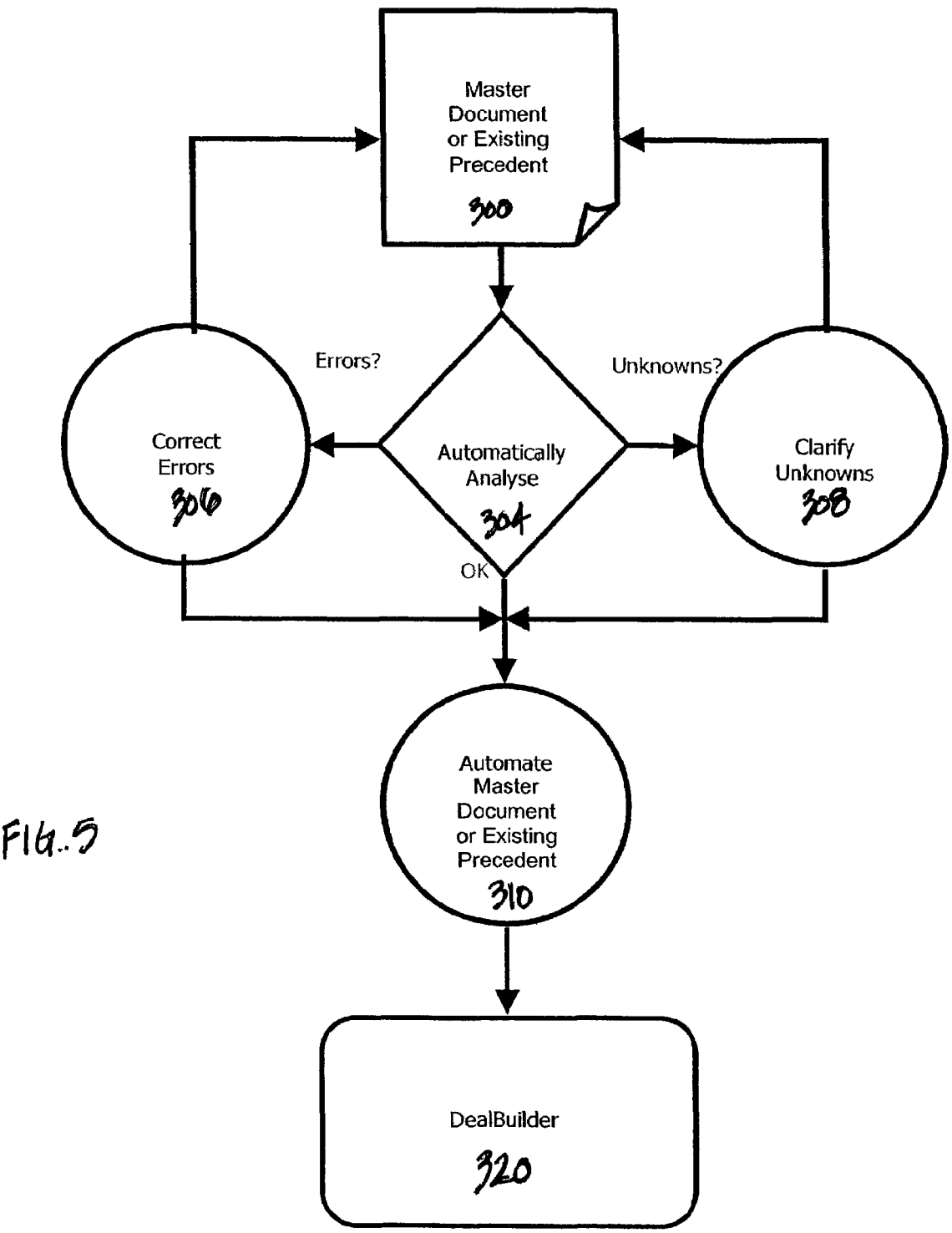
FIG. 5 is a flow diagram illustrating processes followed by the computer program or system.
Figure 6:
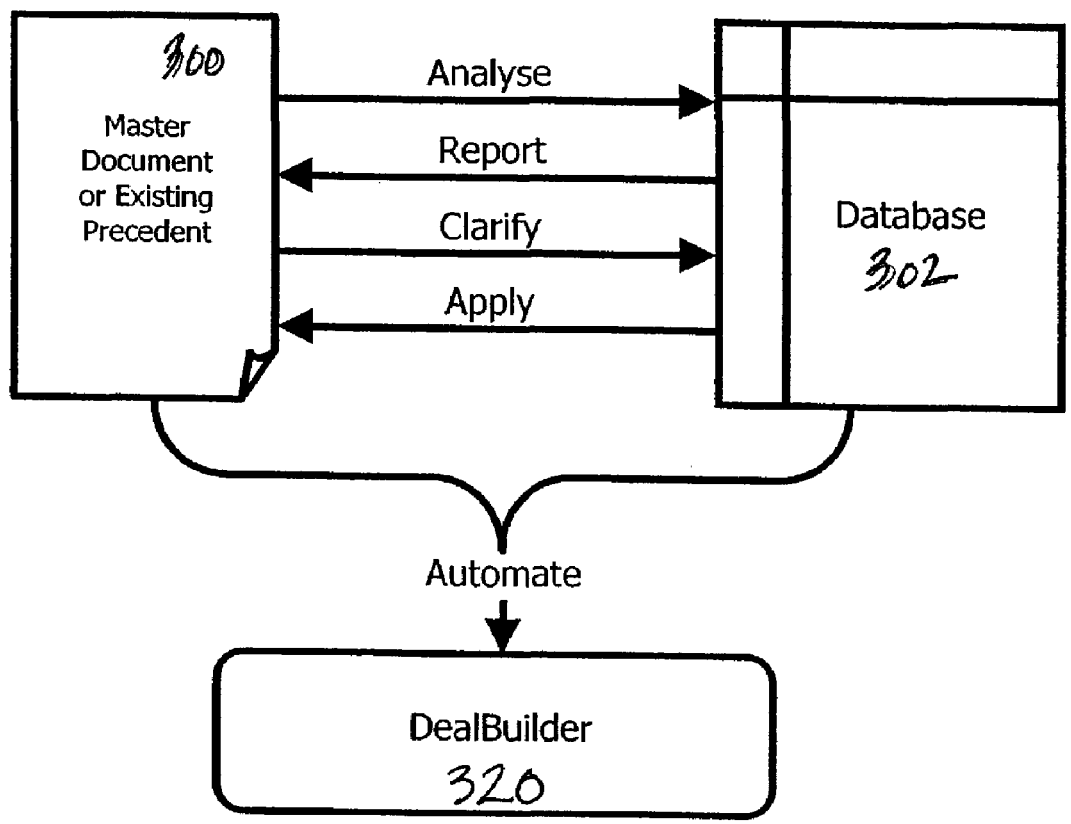
FIG. 6 is a block diagram illustrating the processes performed in the computer program or system.

IntellX and DealBuilder may be used entirely independently, but they may be advantageously used in combination to create masters and then to use them for automated document generation. FIGS. 5 and 6 show various processes of using IntellX to analyze, report on and clarify a master or existing precedent to generate a new clarified master or precedent, and to generate data for DealBuilder to use. As illustrated by elements 300-320, a master or existing precedent is supplied to IntellX to be automatically analyzed. After analysis, which is described in greater detail below, user input may be provided to enable correction of any errors in the master or precedent or to clarify any ambiguities or unknowns. Using this user input, a clarified or corrected master or precedent may be generated. This may then be used to generate data for input to DealBuilder for use in generating customized documents.

Importantly, the input master or existing precedent, need not have been created by a team of both knowledge expert and information technology expert. It may simply be an existing precedent created for manual document generation by a knowledge expert and stored in electronic form. Furthermore, there may be errors, or ambiguities in both the particular existing precedent and inherently in the "house style" in which the precedent was written. IntellX is able to analyze the precedent to expose these errors or unknowns, report to a user on those errors or unknowns and on the master in general, receive input from a user clarifying unknowns and correcting errors, and apply the input information to produce a clarified and corrected master or precedent for use in DealBuilder.

IntellX may also be used independently of DealBuilder to analyze an input master or existing precedent written in one mark-up notation or style and to generate a new output master or precedent written in another mark-up notation or style. FIG. 7 illustrates the processes and data flows (elements 400-412) that are used by IntellX to achieve this. IntellX stores two data structures representing two different mark-up or notation styles. These are defined in a meta-level definition as described in greater detail below. One of these is used as an input filter for analyzing an input master or existing precedent. A database representation of the master or existing precedent is thus generated, as will be described in greater detail below. Briefly, the database representation represents the component elements of the input master or existing precedent in a predetermined data structure (in fact the same structure as the meta-level definition) as will also be described below. The other data structure, representing a different mark-up or notation style, is used as an output filter for generating a new master or precedent written in the different mark-up notation or style. Thus, IntellX may be used, independently of DealBuilder, to translate masters or precedents between different mark-up notations or styles.

The master or existing precedents input to IntellX for translation need not be error-free, nor need they be written in an unambiguous mark-up notation or style. Translation may be achieved despite errors, unknowns, or ambiguities. Similarly, translation need not be into an unambiguous mark-up notation or style. However, it will be appreciated that information may be lost in translation if the output mark-up notation or style is more ambiguous than the input mark-up notation or style.

While it has been described above with reference to FIGS. 5 and 6 how IntellX may be used to analyze, report on and clarify a master or existing precedent to generate a new clarified master or precedent, and to generate data for DealBuilder to use, and while it has been described above with reference to FIG. 7 how IntellX may be used to analyze an input master or existing precedent written in one mark-up notation or style and to generate a new output master or precedent written in another mark-up notation or style, it will be apparent that IntellX may be used to perform both these functions. Thus, an existing precedent written in one mark-up notation or style, such as a contract written in an existing but ambiguous "house style" may be translated into a master written in another mark-up notation or style, such as an ambiguity-free mark-up notation, and any errors, unknowns, or ambiguities arising in the existing precedent may be corrected or clarified by a user to generate a perfect master.

The process of analysis and generation of masters or precedents, and the predetermined data structure of the database representation mentioned above with reference to FIG. 7, will now be described in more detail with reference to Appendices A, B, C and D and FIGS. 8 and 9.

Appendices A and C are written descriptions of two mark-up notations or styles and Appendices B and D are sample precedents/masters written in the mark-up notations or styles of Appendices A and C respectively. The sample precedents/masters are contracts for the sale of freehold property under English law. The style of Appendices A and B is a common but ambiguous "house style" of a well-known legal publishing house. The mark-up notation of Appendices C and D is an unambiguous notation capable of representing the component elements and their interrelationships of many different common mark-up notations or styles. The mark-up notation of Appendices C and D has been devised as an example.

Both of the mark-up notations or styles are applicable to existing precedents for use in manual document generation. In particular, they are applicable to simple linearly-ordered textual content such as may be printed in a book or stored as a simple text file. In other words the mark-up notations or styles use simple text characters for representing various component parts and elements of a master or precedent. Masters and precedents created in these mark-up notations or styles are particularly suited for processing by a word processor application such as Microsoft Word or simpler text-based applications. In contrast, the database representation of a master mentioned above, which will be described with reference to FIGS. 8 and 9, is more suited to processing by a database application such as Microsoft Access. This representation is not directly representable as simple linearly-ordered textual content. However, FIGS. 8 and 9 represent the database structure as a table for ease of understanding. It may also be noted that the definition of a mark-up notation or style, as opposed to a master or precedent written in that mark-up notation or style, is itself stored as a database structure, such as the input and output filters of FIG. 7, although, for ease of explanation, Appendices A and C are written in natural language text.

Common to the definition of all mark-up notations or styles defined in IntellX (of which there may be any number) and common to the database representation of a master or precedent is a meta-level definition. This meta-level definition makes certain assumptions about all masters, existing precedents and of all mark-up notations or styles which may be applied to them. It is this meta-level structural definition that allows various mark-up notations or styles to be defined in IntellX, that allows masters or precedents to be represented in a database representation independent of any particular mark-up notation or style, and that allows translation between various mark-up notations or styles. The main assumptions of the meta-level definition are as follows:

1) Masters or precedents are linearly ordered text or content which may be divided into one or more sections including:
   a) at least one or more wording sections (e.g. clauses of a contract);
   b) optionally one or more guidance sections;
   c) optionally one or more logical usage rule sections containing logical usage rule objects; and
   d) optionally one or more variable sections for defining the format and acceptable inputs for variable objects.

Note that sections may be contiguous within a master or precedent or may be interwoven.

2) The compulsory wording section may optionally contain:
   a) one or more paragraphs;
   b) conditional objects which may be nested to any level;
   c) variable objects which may be complex (i.e. composed of simpler variables using logical or mathematical operators);
   d) cross reference objects (i.e. for referencing paragraphs of wording which may be renamed or renumbered on generating customized document);
   e) include objects for including other masters or precedents within the wording of a master or precedent; and
   f) calculation objects for performing calculations on variables and other data.

With this meta-level structural definition, any mark-up notation or style may be defined by indicating which set of characters (which may be text characters or control characters like Microsoft Word section or paragraph breaks) are used to indicate the various possible meta-level components—sections, paragraphs and objects—and optionally where in a master or precedent they are found. Clearly, the definition of a mark-up notation or style may be ambiguous (as is the case with the definition in Appendix A since, for example, square brackets "[" and "]" are used for both variable objects and conditional objects) or unambiguous (as is the case with Appendix C). Furthermore, the definition of a mark-up notation or style may be complete in that all the meta-level components (sections, paragraphs and objects) are capable of being represented by characters or by position in a master or precedent (as is the case with Appendix C) or incomplete in that some of the meta-level components are not representable (as is the case with Appendix A).

A particular master or precedent written in one mark-up notation or style may be error and ambiguity free, notwithstanding that the mark-up notation or style is ambiguous and, likewise, another master or precedent written in another mark-up notation or style may contain errors or ambiguities, notwithstanding that the mark-up notation or style is unambiguous. IntellX is capable of determining errors, ambiguities or unknowns, whether present as a result of a particular master or precedent, its mark-up notation or style, or both.

For a fuller understanding of how a particular mark-up notation or style is defined in terms of the meta-level structural definition, it is suggested that the reader refer to the particular examples set out in Appendices A and D. With the sample masters set out at Appendices B and D it can be seen how different mark-up notations or styles may be used to represent the same meta-level structural components. However, note at this stage that there is an error in the precedent of Appendix B. At Clause 12 there is a missing closing square bracket. It is very hard to spot this error, but it renders the clause ambiguous and requires clarification. In Appendix D, where the corresponding clause is Clause 13, the error has been corrected. The process of analyzing, reporting on and clarifying a master from the point of view of the user of IntellX is fully described in Appendix E which is a tutorial on using IntellX.

It will now be described how IntellX analyzes an input master or precedent to generate a database representation using, as an input filter, a particular mark-up notation or style definition and how IntellX generates a new master or precedent using, as an output filter, a possibly different mark-up notation or style definition and possibly after corrections or clarifications have been provided by a user. As with the document generation system described with reference to FIGS. 1 through 4, IntellX uses the object linking and embedding interfaces of Microsoft Word to control it to perform functions including opening and displaying a master document or precedent, scanning a master document or precedent character by character (including control characters like Microsoft Word section or paragraph breaks); editing a master document by, for example, adding characters at various positions and saving a master document or precedent.

Figure 10:
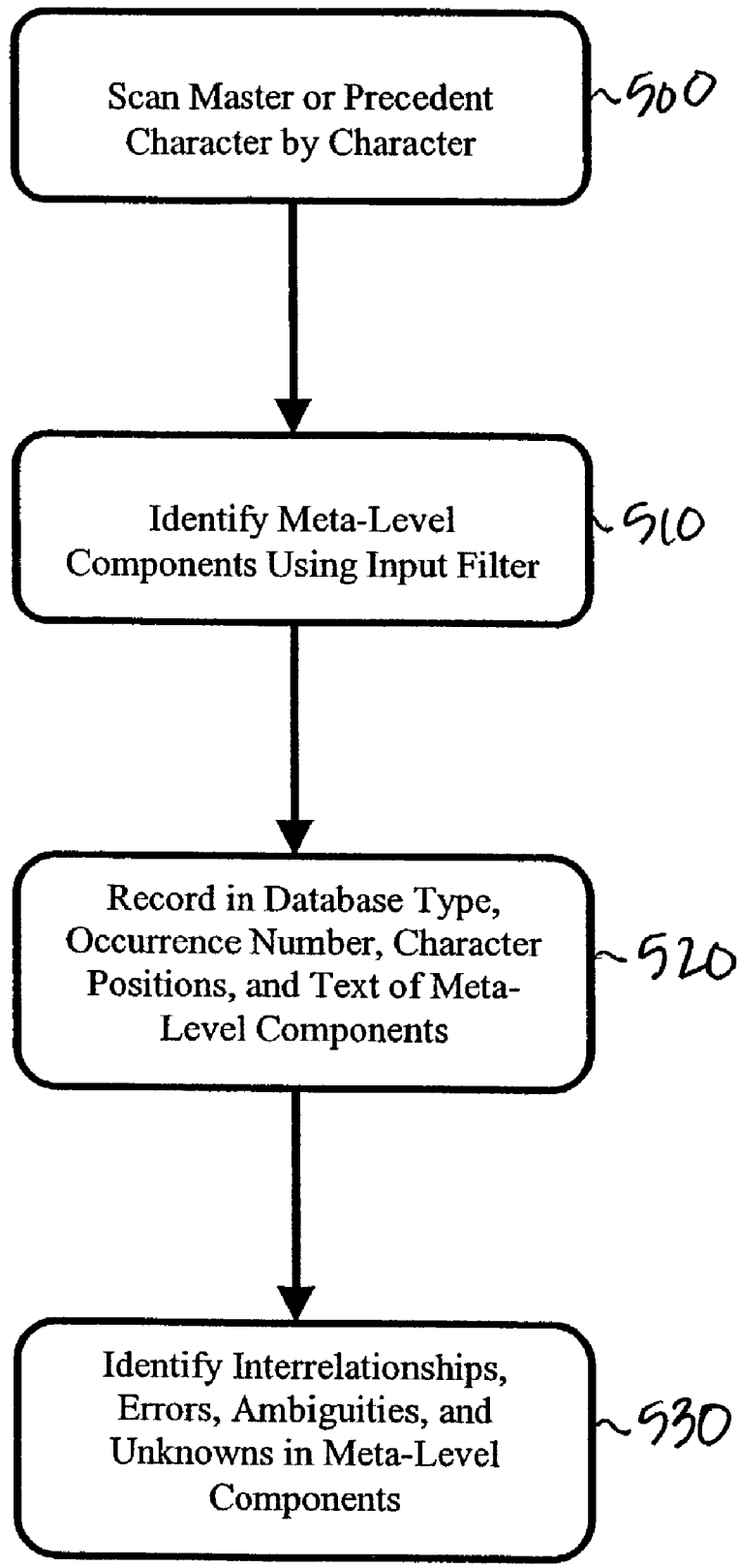
FIG. 10 shows an embodiment of the process of analyzing as performed in the computer program or system.

The process is illustrated in FIG. 10 (steps 500-530). IntellX first scans the master or precedent character by character to generate a ordered character list, each character having a unique position in the list. Next, using the input filter mark-up notation or style definition, IntellX scans the list for the various possible meta-level components (sections, paragraphs and the various wording objects), which may be represented by delimiting characters and by position within the list. As meta-level components are found, they are given a sequential occurrence number (1, 2, 3, . . . ) and are entered into a database by type, occurrence number, character position, text (i.e. the actual text of the object), and other information. The various meta-level components are each scanned for in order. The order is 1) sections (wording, guidance, usage rule definitions, variable definitions); 2) paragraphs; 3) include objects, 4) cross-reference objects, 5) calculation objects, 6) variable objects and finally, 7) conditional objects.

When scanning for meta-level components, it can be advantageous that conditional objects be scanned last, or at least after variable objects. This is because with ambiguous mark-up notations or styles it is often these elements which are ambiguously represented, for example using square brackets for both, and since variables can easily be mistaken for conditional text, but conditional text will in general not be recognized as a defined variable, better results can be achieved by scanning for variable objects before conditional objects.

FIG. 8 shows a table representing various entries in the database corresponding to sample wording objects that may be found within the wording section. Other entries are also made for the sections themselves, but these are not shown. It can be seen that various object types, such as variable, conditional, usage rule, paragraph, cross-reference, include, and calculation, are shown together with their sequential occurrence numbers (randomly chosen here), character position, text and other information. The other information field is used for identifying the interrelationships between the various objects listed and any errors, unknowns or ambiguities. It is only created after all the objects have been first identified. IntellX recognizes when one object refers to another, for example, when a particular conditional is dependent on a particular usage rule, or when a particular usage rule depends on a particular variable and so on. IntellX records the nesting level of conditionals in the other information field. IntellX also recognizes when repeated instances of a variable or other object are actually the same and indicates this in the other information section.

Variables are named (i.e. known) in order to be recognized and may need defined formats and possibly value ranges. Variables may be defined in the variables section of the master, or may be defined in a general variable dictionary maintained by IntellX for use with any master or precedent being analyzed. Similarly, conditionals have defined logical usage rules, as defined in the usage rules section. If the master or precedent is error-free, unambiguous, and all objects (especially variables and usage rules) are defined or at least known, a perfect database representation may be generated detailing all the component elements of the master or precedent which is independent of the particular input filter markup notation or style definition.

This database representation may then be used to generate a new master or precedent using an output filter with a different mark-up notation or style definition. The process involves creating a new character list using the text extracted from the original master, but using the character and position representations of the output filter (rather than the input filter) to delimit the various objects by object type and to reference them according to their interrelationships identified in the other information field. In general, this will mean that the various objects in the newly generated character list will have different character positions and possibly different occurrence numbers. However, the text will remain the same, and, provided the output filter mark-up notation or style is unambiguous, no information content will be lost in the translation.

The database representation is also used for reporting and clarification purposes. The process of analyzing and reporting a master from the point of view of a user of IntellX is fully described in Appendix E. However, the information extracted by the analyzing process, in particular the object type, character position and other information field (especially the nesting level for conditionals), is particularly suited to generating the audit report described in Appendix E. For instance, the nesting levels of conditionals and their character ranges is used to generate the color map of the master or precedent described in Appendix E.

Where a master or precedent contains errors (such as illegal usage rules or calculations), incorrect dependencies (such as one variable being unexpectedly dependent upon another variable), ambiguities (such as missing nesting brackets), or unknown objects (such as variables which are not defined in the variables section or in the IntellX variable dictionary or usage rules which are undefined in the usage rules section), a database representation may still be generated detailing all the known component elements of the master or precedent and all of the known interrelationships. Furthermore, information may be entered into the other information field specifying the particular errors, ambiguities and unknown objects. FIG. 9 shows a table representing various entries in the database corresponding to wording objects where errors, ambiguities and unknowns are present. Thus, for example, Variable 1 Date:Agreement may be a variable undefined in the variable section and in the IntellX variable dictionary. Conditional 2 may have no usage rule defining its conditional use or may have a syntax error such as a missing or extra nesting character. Syntax errors in usage rules or calculations (i.e. illegal usage rules or calculations) may also be recorded. Using this information, user interfaces may be generated for capturing further information from a user to correct and clarify the master so that a perfect master may be generated. IntellX also provides graphical user interfaces, such as drop-down lists, tick boxes, and so on to aid user specification of variable formats, usage rules and the correction of errors in usage rules, calculations and so on.

The process of using IntellX to perform the analysis, clarification, reporting on and generation of master documents for use in automated document generation and for using DealBuilder to automate masters processed using IntellX is fully described in Appendix E.

What is claimed is:

1. A computer-implemented method of generating data representing a master document for use in an automated document generation system, the master document including predetermined elements of document content selected by rules operating on input information, comprising:

storing data representing a first mark-up notation or style and data representing a second mark-up notation or style different to the first mark-up notation or style;

storing data representing a mapping between the first and second mark-up notations or styles;

receiving data representing a precedent or master document written in the first mark-up notation or style;

analyzing the received data, dependent upon the data representing the first mark-up notation or style, to determine component elements of the first precedent or master document and the interrelationships of the component elements;

generating data representing a precedent or master document written in the second mark-up notation or style based on the analysis and dependent upon the data representing the mapping and the data representing the second mark-up notation or style;

generating a user interface to capture unknown information relating to component elements or information resolving errors or ambiguities in any component elements or in their interrelationships;

generating data representing a clarified or partially clarified precedent or master document based on the captured information and the data representing the precedent or master document; and outputting the generated data.

2. The method of claim 1, wherein the mapping comprises a meta-level definition of a plurality of types of component elements of master documents or precedents.

3. The method of claim 2, wherein the analysis comprises identifying component elements by type.

4. The method of claim 3, wherein the component element types include at least one of control or data variables, elements of conditional content, and usage conditions for the elements of conditional content.

5. The method of claim 3, wherein the analysis comprises generating a database of component elements indicating their identified type and their position within the precedent or master document.

6. The method of claim 1, wherein the analysis comprises first identifying any control or data variables in the precedent or master document and then identifying any elements of conditional content.

7. The method of claim 1, wherein the data representing the first mark-up notation or style includes definitions of a character representation and positioning of different types of component elements.

8. The method of claim 1, wherein the data representing the second mark-up notation or style preferably includes definitions of a character representation and positioning of different types of component elements.

9. The method of claim 1, wherein the data representing a mark-up notation or style is itself represented in a meta-level definition which identifies a plurality of component element types.

10. The method of claim 1, further comprising generating data representing a report document, the report document indicating different types of component elements of the precedent or master document and interrelationships between component elements of the precedent or master document.

11. The method of claim 10, wherein the report document represents the different types of component elements of the precedent or master document in the form of differently colored regions overlaid on the precedent or master document such that the content of the precedent or master document remains visible.

12. The method of claim 11, wherein the different types of component elements include different levels of nesting of conditional content and differently colored regions may represent the different levels of nesting.

13. The method of claim 12, wherein differently colored regions for more deeply nested levels overlay differently colored regions for less deeply nested levels.

14. The method of claim 1, wherein the unknown information relating to component elements comprises unknown variables or unknown usage conditions for elements of conditional content.

15. The method of claim 1, further comprising determining whether there is any unknown information relating to component elements of the precedent or master document.

16. The method of claim 1, further comprising determining whether there are any errors or ambiguities in component elements of the precedent or master document or in the interrelationships of the component elements.

17. The method of claim 16, wherein the errors or ambiguities are errors or ambiguities in the syntax of usage conditions for elements of conditional content.

18. A computer-implemented method of generating a master document for use in an automated document generation system from an existing precedent for use in manual document generation, the master document including predetermined elements of document content selected by rules operating on input information, comprising:

storing data representing a first mark-up style or notation of existing precedents for use in manual document generation and data representing a second mark-up style or notation of master documents for use in an automated document generation system;

receiving data representing an existing precedent for use in manual document generation written in the first mark-up style or notation;

analyzing the received data based on the data representing the first mark-up style or notation to identify in the existing precedent one or more component elements including control or data variables, elements of conditional content for possible inclusion in a customized document to be generated, and logical usage rules for determining whether or not to include elements of conditional content in dependence on control or data variables;

generating data representing a master document for use in automated document generation based on the analysis and the second mark-up style or notation, wherein the master document is written in the second mark-up style or notation;

generating a user interface to capture unknown information relating to component elements or information resolving errors or ambiguities in any component elements or in their interrelationships;

generating data representing a clarified or partially clarified precedent or master document based on the captured information and the data representing the precedent or master document; and outputting the generated data.

19. The method of claim 18, wherein the data representing the first or second mark-up notations or styles are represented in a meta-level definition which identifies a plurality of component element types.

20. The method of claim 18, wherein the analysis comprises first identifying any control or data variables in the precedent or master document and then identifying any elements of conditional content.

21. The method of claim 18, wherein the analysis comprises generating a database of component elements indicating their identified type, position within the precedent or master document, and any references component elements have to each other.

22. The method of claim 18, wherein the data representing the first mark-up notation or style includes definitions of a character representation and positioning of different types of component elements.

23. The method of claim 18, wherein the data representing the second mark-up notation or style preferably includes definitions of a character representation and positioning of different types of component elements.

24. In a computer system, an automated document generation method of generating a customized document on the basis of an existing precedent for use in manual document generation, a master document including predetermined elements of document content selected by rules operating on input information, the method comprising:

receiving data representing an existing precedent for use in manual document generation;

generating data representing a master document for use in automated document generation using the method comprising:

storing data representing a first mark-up style or notation of existing precedents for use in manual document generation and data representing a second mark-up style or notation of master documents for use in an automated document generation system, receiving data representing an existing precedent for use in manual document generation written in the first mark-up style or notation, analyzing the received data based on the data representing the first mark-up style or notation to identify in the existing precedent one or more component elements including control or data variables, elements of conditional content for possible inclusion in a customized document to be generated, and logical usage rules for determining whether or not to include elements of conditional content in dependence on control or data variables, and generating data representing a master document for use in automated document generation based on the analysis and the second mark-up style or notation, wherein the master document is written in the second mark-up style or notation;

generating a user interface to capture unknown information relating to component elements or information resolving errors or ambiguities in any component elements or in their interrelationships;

generating data representing a clarified or partially clarified precedent or master document based on the captured information and the data representing the precedent or master document; and generating a customized document using the generated master document.

25. A computer system in which a master document includes predetermined elements of document content selected by rules operating on input information, comprising:

a processor;

a memory coupled to the processor;

a first data base configured to store data representing a first mark-up notation or style, data representing a second mark-up notation or style different to the first mark-up notation or style and data representing a mapping between the first and second mark-up notations or styles;

an input interface for receiving data representing a precedent or master document written in the first mark-up notation or style;

a processing module configured to analyze the received data to determine component elements of the first precedent or master document and the interrelationships of the component elements, the analysis being in dependence on the data representing the first mark-up notation or style;

a processing module configured to generate data representing a precedent or master document written in the second mark-up notation or style based on the analysis, the data representing the mapping, and the data representing the second mark-up notation or style;

a processing module configured to generate a user interface to capture unknown information relating to component elements or information resolving errors or ambiguities in any component elements or in their interrelationships;

a processing module configured to generate data representing a clarified or partially clarified precedent or master document based on the captured information and the data representing the precedent or master document; and an output interface for outputting the generated data.

26. A computer system for generating a master document for use in an automated document generation system from an existing precedent for use in manual document generation, the master document including predetermined elements of document content selected by rules operating on input information, the computer system comprising:

a processor;

a memory coupled to the processor;

a database configured to store data representing a first mark-up style or notation of existing precedents for use in manual document generation and data representing a second mark-up style or notation of master documents for use in an automated document generation system;

an input interface configured to receive data representing an existing precedent for use in manual document generation written in the first mark-up style or notation;

a processing module configured to analyze the received data based on the data representing the first mark-up style or notation to identify one or more component elements in the existing precedent, including control or data variables, elements of conditional content for possible inclusion in a customized document to be generated, and logical usage rules for determining whether or not to include elements of conditional content in dependence on control or data variables;

a processing module configured to generate data representing a master document for use in automated document generation based on the analysis and the second mark-up notation or style, wherein the master document is written in the second mark-up style or notation;

a processing module configured to generate a user interface to capture unknown information relating to component elements or information resolving errors or ambiguities in any component elements or in their interrelationships;

a processing module configured to generate data representing a clarified or partially clarified precedent or master document based on the captured information and the data representing the precedent or master document; and an output interface for outputting the generated data.

* * * * *